United States Patent
Sundararajan et al.

(10) Patent No.: US 12,225,051 B2
(45) Date of Patent: Feb. 11, 2025

(54) IDENTITY-BASED POLICY ENFORCEMENT IN WIDE AREA NETWORKS

(71) Applicant: Cisco Technology, Inc., San Jose, CA (US)

(72) Inventors: Balaji Sundararajan, Fremont, CA (US); Vishnuprasad Raghavan, Sammamish, WA (US); Kannan Kumar, Tracy, CA (US); Ramana Babu Polamarasetti, Fremont, CA (US); Mahalakshmi Rajaram, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 17/876,190

(22) Filed: Jul. 28, 2022

(65) Prior Publication Data
US 2024/0039956 A1    Feb. 1, 2024

(51) Int. Cl.
H04L 9/40    (2022.01)

(52) U.S. Cl.
CPC ........ H04L 63/20 (2013.01); H04L 63/0236 (2013.01); H04L 63/102 (2013.01)

(58) Field of Classification Search
None
See application file for complete search history.

(56) References Cited

U.S. PATENT DOCUMENTS

| | | | |
|---|---|---|---|
| 11,159,576 B1 | 10/2021 | Ly et al. | |
| 2006/0029064 A1* | 2/2006 | Rao | H04L 61/2557 370/389 |
| 2006/0136987 A1* | 6/2006 | Okuda | H04L 9/40 726/1 |
| 2012/0246325 A1* | 9/2012 | Pancorbo Marcos | H04L 43/00 709/227 |
| 2013/0074174 A1* | 3/2013 | Huang | H04L 45/04 726/12 |
| 2015/0089594 A1* | 3/2015 | Subramanian | H04L 63/08 726/4 |
| 2019/0166013 A1* | 5/2019 | Shaikh | H04L 41/20 |
| 2020/0014662 A1* | 1/2020 | Chanda | H04L 65/1036 |
| 2020/0177503 A1 | 6/2020 | Hooda et al. | |

(Continued)

FOREIGN PATENT DOCUMENTS

| CN | 112543170 A | 3/2021 |
|---|---|---|
| EP | 1994673 B1 | 11/2014 |

OTHER PUBLICATIONS

Polcak, Libor, et al., "High Level Policies in SDN," Research Gate, published Mar. 2016, 36 pages.

(Continued)

Primary Examiner — Kaveh Abrishamkar
(74) Attorney, Agent, or Firm — Lee & Hayes, P.C.

(57) ABSTRACT

Techniques for user identity-based security policy enforcement. The techniques may include sending, to an edge device associated with a network, a networking policy associated with a user. The techniques may also include receiving, from an identity provider, an IP address associated with the user. Additionally, the techniques may include sending, to the edge device, an indication to associate the IP address with the user such that the edge device applies the networking policy to packets that include the IP address.

20 Claims, 8 Drawing Sheets

(56) References Cited

U.S. PATENT DOCUMENTS

2020/0344210 A1    10/2020  Vijayvargiya
2022/0078619 A1*   3/2022   Mahamkali ....... H04W 28/0215
2022/0086061 A1    3/2022   Natal et al.
2022/0210009 A1*   6/2022   A ........................ H04L 41/0843

OTHER PUBLICATIONS

PCT Search Report and Written Opinion mailed Nov. 3, 2023 for PCT Application No. PCT/US23/28694, "Identity-Based Policy Enforcement in Wide Area Networks", 13 pages.

Richter, et al, "Practical Deployment of Cisco Identity Services Engine (ISE)", Jan. 1, 2016, pp. 1-152.

* cited by examiner

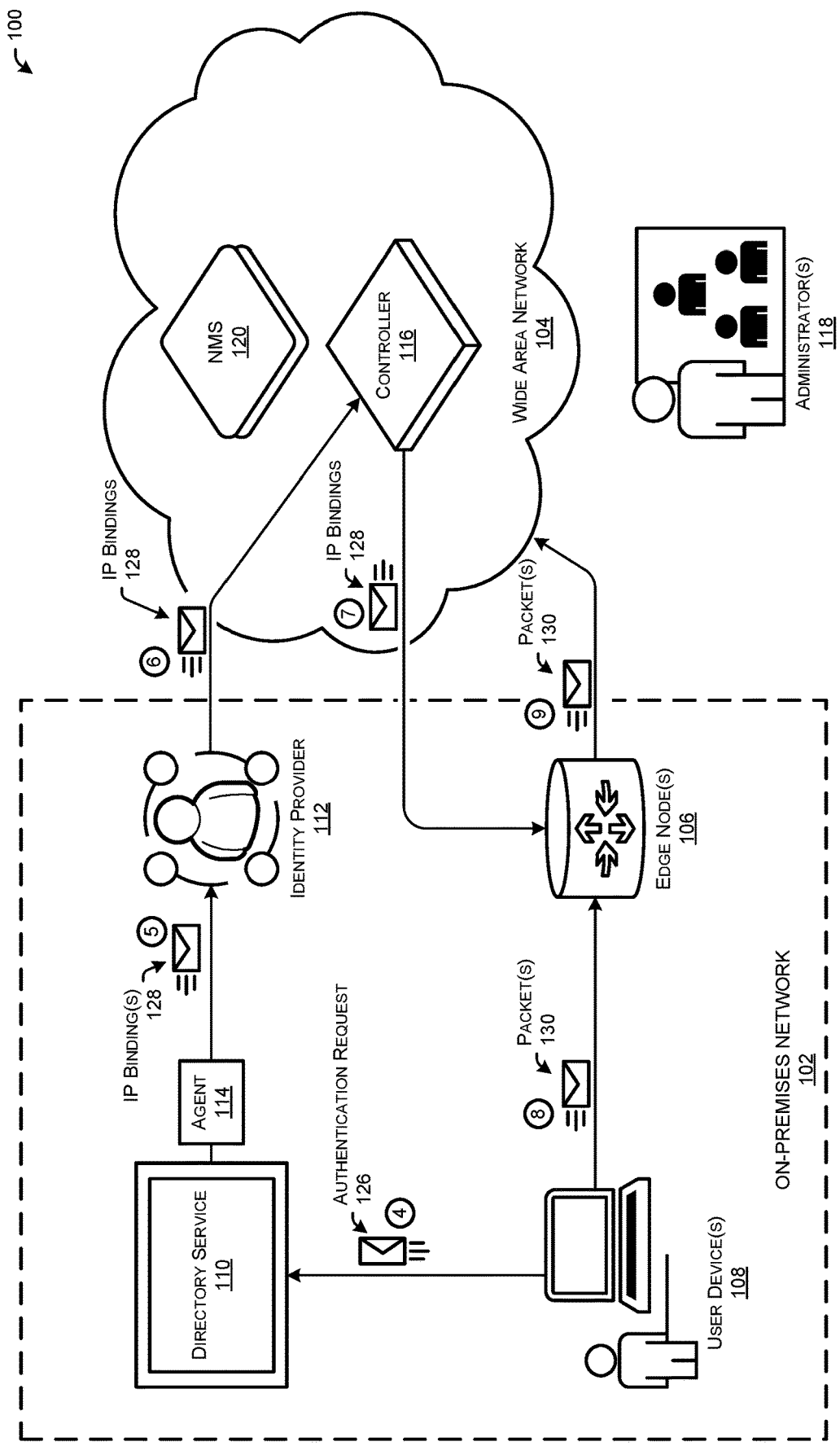

| Source 302 | Destination 304 | Policy Action 306 |
|---|---|---|
| User Group A | Destination A | Allow |
| User Group B | Destinations A & B | Allow |
| User Group C | Destination C | Deny |
| Username A | Destinations A & C | Allow |
| Username B | Destination B | Deny |
| Username C | Destinations A, B, & C | Allow |
| ... | ... | ... |
| Any | Any | Drop |

FIG. 3

IDENTITY-BASED POLICY ENFORCEMENT IN WIDE AREA NETWORKS

TECHNICAL FIELD

The present disclosure relates generally to techniques for user identity-based security policy enforcement in wide area networks. More specifically, this disclosure describes techniques for receiving internet protocol (IP) address to username/user group bindings from an identity service provider to dynamically enforce identity-based networking policies.

BACKGROUND

User identity aware policy does not exist for access enforcements. Consequently, networks are forced to rely on IP addresses to enforce policy. However, using IP addresses for policy enforcement is less than ideal because users can move and their IP address can change from time to time. Additionally, user groups can be part of a larger subset of organizational groups. As such, consistently enforcing network policy under these circumstances can be challenging.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 1A and 1B collectively illustrate an example architecture and example operations that may be performed by the architecture to implement the various aspects of the technologies described herein.

FIG. 3 is a table illustrating example identity-based policies that may be enforced with respect to traffic sent by a member of a particular user group and/or a particular user.

DESCRIPTION OF EXAMPLE EMBODIMENTS

Overview

Figure 1A:
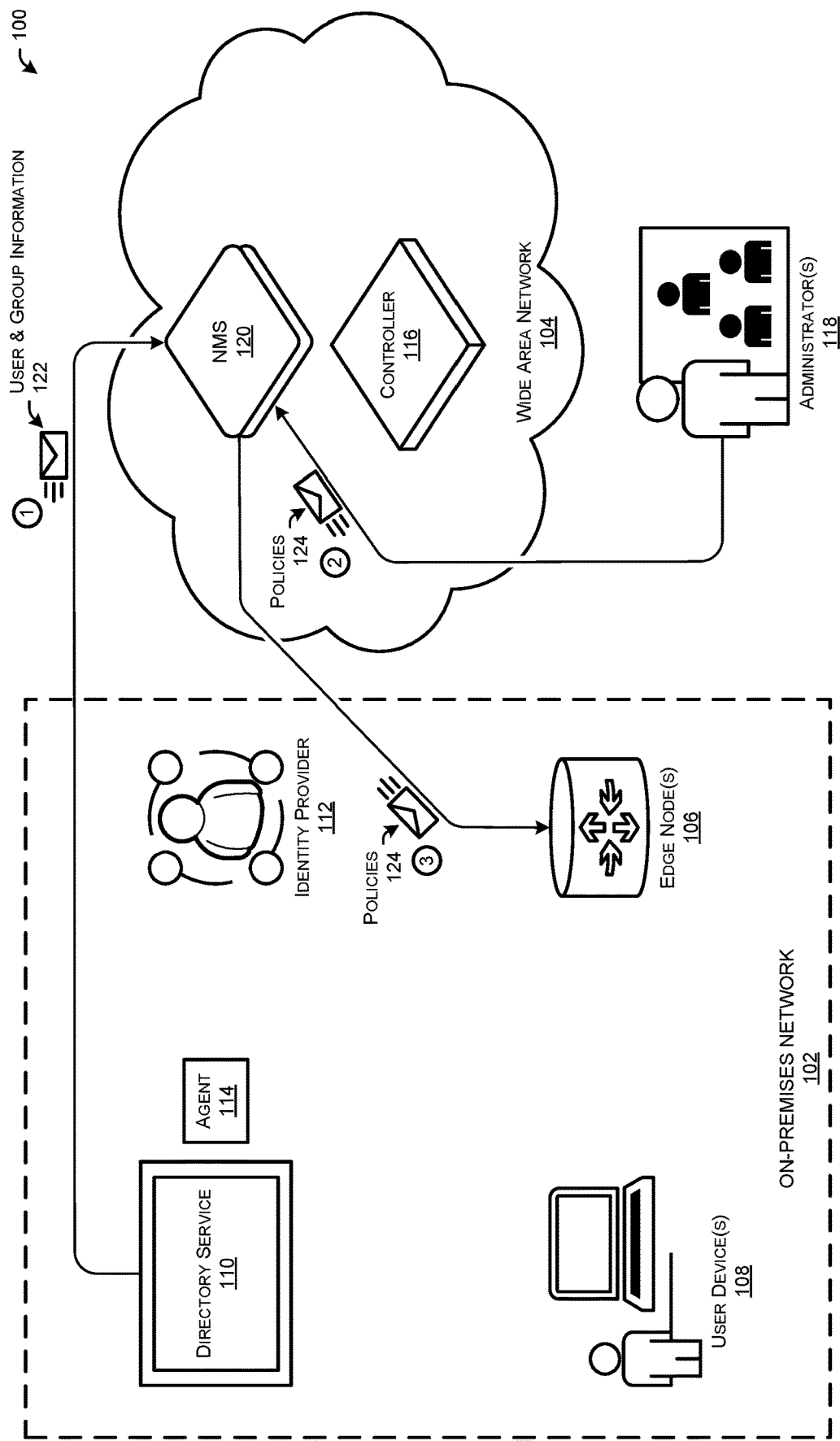

This disclosure describes various technologies for identity-based policy enforcement in wide area networks. More specifically, this disclosure describes techniques for receiving internet protocol (IP) address to username/user group mappings from an identity service provider to dynamically enforce identity-based networking policies. By way of example, and not limitation, the techniques described herein may include sending, to an edge device associated with a network, a networking policy associated with a user. The techniques may also include receiving, from an identity provider, a first IP address associated with the user. Additionally, the techniques may include sending, to the edge device, an indication to associate the first IP address with the user such that the edge device applies the networking policy to packets that include the first IP address.

Additionally, the techniques described herein may be performed as a method and/or by a system having non-transitory computer-readable media storing computer-executable instructions that, when executed by one or more processors, performs the techniques described above.

EXAMPLE EMBODIMENTS

As discussed above, using IP addresses for policy enforcement is less than ideal in certain situations because users can move and their IP address can change from time to time. Additionally, user groups can be part of a larger subset of organizational groups. As such, consistently enforcing network policy under these circumstances can be challenging.

Accordingly, this application describes technologies that allow for user identity-aware policies to be configured in such a way that active directory constructs may be used to create user (e.g., username) and user group aware policy that can be applied to firewall rules. For example, a policy may be configured such that all member users of a specific user group can be allowed or denied access to certain wide area network (WAN) resources, direct internet access, communicate with other users or user groups, etc. For example, when a user logs in to a directory service (e.g., active directory), their log in may be detected via an application programming interface (API) and a user (e.g., username) to IP binding may be determined for the user. Based on this IP binding, firewall policies may be determined and/or enforced that are specific to the user and/or a user group that the user belongs to. In some examples, the user to IP binding may be retained for a threshold period of time (e.g., so long as the user is on a local area network (LAN) side of the network), and an identity service provider may provide details regarding the user's connectivity.

In some examples, to configure a network to perform the techniques of this disclosure for enforcing user identity-aware policies, a network administrator may configure a network management system (NMS) to connect to an identity provider (e.g., Cisco's Identity Services Engine or PX Cloud, AWS Identity Services, Google Identity Services, etc.). such that the NMS can pull the users (e.g., usernames) and user groups from the identity provider. In this way, the network administrator may configure security policies using usernames and user groups, instead of setting up policies for specific IP addresses.

In some examples, the NMS may further configure a controller of the network to connect to the identity provider as a client and retrieve IP address to username bindings and/or username to user group bindings. Additionally, or alternatively, the controller may be configured to pull IP address to security group tag (SGT) data to support SGT based policies on edge nodes (e.g., edge routers). In some examples, these bindings may be distributed to the edge nodes (e.g., using an overlay management protocol) and configured on the edge nodes as a table for use in traffic classification. In some instances, the distribution can be based on configured policies and/or based on router capabilities (e.g., presence of security policy, router capacity, etc.). In some examples, a security policy may be pushed from the NMS and the policy may reference this table, and the edge nodes may use the table to find the username and/or user groups that a particular IP address belongs to in order to enforces the policy at the edge node.

According to the techniques of this disclosure, several advantages in computer-related technology can be achieved. For instance, the techniques of this disclosure make it possible so that not all network edge nodes need all of the policy data because not all of the identity information is going to be used in all the network edge nodes. That is, the techniques enable the edge routers to have access to the security policies and IP bindings on an as-needed basis, and the network controller can dynamically decide which edge nodes of the network have security policies enabled and which edge nodes need information about certain usernames and/or user groups. In other words, the network controller can use this information to intelligently distribute the IP bindings only to those edge nodes which need the data. This improves the operation of edge devices by not having to store unnecessary security policies and/or IP bindings that may never be used by the edge device. Additionally, this improves the application of security policies by edge devices in that regardless of where the edge device is located or where a user accesses the network from, the edge device is able to determine and apply the correct security policy.

By way of example, and not limitation, a method according to the techniques describe herein may include sending, by a controller (e.g., NMS, SDN controller, etc.) of a network, a networking policy to an edge node associated with the network. In some examples, the networking policy may be a user identity-based networking policy. For instance, the networking policy may indicate specific policy actions that are to be applied to traffic sent by certain users to certain destinations, on a per user basis. For example, the networking policy may indicate whether a specific user, "Rick," is allowed to send or receive traffic from one or more specific destinations, applications, services, etc. (e.g., YouTube). Additionally, in some examples, the networking policy may further indicate specific policy actions that are to be applied to traffic sent by members of certain user groups to certain destinations, as a whole. For example, the networking policy may indicate whether individual members of a group of users, for instance, "Rick, Aaron, and Blake" who are members of the group "Engineers," are allowed to send or receive traffic from one or more specific destinations, applications, services, etc. In some examples, the networking policy may be one of multiple networking policies that are to be applied to traffic sent by different users and/or members of user groups.

In some examples, the edge node may be an edge device, such as a router, load balancer, or the like. In some instances, the edge node may be located on-prem with respect to an enterprise network or other networked environment. In some examples, the edge node may, from time-to-time, receive updated networking policies from the controller of the network on an as-needed basis. For instance, if the network controller determines that a specific user is going to be sending traffic through a specific edge node, the network controller may send the networking policy for that specific user to that specific edge node. In some examples, the network may be a software-defined wide area network (SD-WAN), a wide area network (WAN), an enterprise network, or any other type of network capable of routing packets from a source to a destination.

In some examples, the method may include receiving, at the controller and from an identity provider, an IP binding associated with a user. For instance, the user may be attempting to access the network or otherwise send traffic over the network to a service through the edge node. In some examples, the IP binding may indicate an IP address associated with the user (e.g., an IP address to username binding). Additionally, or alternatively, the IP binding may indicate a user group that the user is a member of (e.g., a username to user group binding). Additionally, or alternatively, the IP binding may indicate a security group tag (SGT) associated with the IP address (e.g., an IP address to SGT binding). In some examples, as a user's IP address changes over time (e.g., if the user moves to a new location), the controller may receive updated IP bindings from the identity provider.

In some examples, the identity provider may receive or otherwise obtain the IP binding from a directory service associated with the network. For instance, the user may authenticate or login using the directory service, and an agent may forward the IP binding to the identity provider responsive to the user authenticating with the directory service. In response, the identity provider may forward the IP binding to the controller of the network, or the controller of the network may be configured to probe the identity provider for new IP bindings.

In some examples, the method may include sending an indication of the IP binding to the edge device. For instance, the controller of the network may send the indication of the IP binding to the edge device so that the edge device may apply the networking policy to packets that include the IP address. That is, the edge device may use the IP bindings to determine which users are sending which packets. For instance, the edge device may lookup an IP address included in a packet to determine which username is bound to that IP address, as well as whether that username is bound to any user groups. In this way, the edge device can determine how to handle the packet (e.g., allow the packet, deny the packet, drop the packet, etc.). In some instances, these IP bindings may be distributed to the edge node by the controller of the network using an overlay management protocol. In some examples, the IP bindings may be configured on the edge nodes as a table or sent to the edge nodes as a table. In some instances, whether the controller distributes the IP bindings to certain edge nodes may be based on configured policies and/or edge node capabilities (e.g., presence of security policy, router capacity, etc.). In some examples, a security policy may be pushed from the controller and the security policy may reference an IP binding table, and the edge nodes may use the IP binding table to find a username and/or user group that a particular IP address belongs to in order to enforce the security policy at the edge node.

In some examples, the controller of the network may receive, from the identity provider, other IP bindings associated with the user. For instance, these other IP bindings may be updated bindings as the user's IP address changes from time-to-time. As such, the other IP binding may indicate another IP address associated with the user that different from the original IP address. In such examples, the controller may send, to the edge node or to another edge node, an indication of the other IP binding to cause the edge device or the other edge device to apply the networking policy to packets that include the other IP address. the controller may send, to the edge node, an indication to dissociate the original IP address with the user.

In some examples, in addition to security policies, a policy sent to an edge node from the controller of the network may indicate other operations that are to be performed with respect to traffic sent by certain users. For instance, the policy may indicate whether any network address translation (NAT) is to be performed with respect to the packet, whether the packet is to be sent to one or more services of a service chain, whether the packet is to be sent to a cloud-delivered firewall, or the like.

According to the techniques of this disclosure, several advantages in computer-related technology can be achieved. For instance, the techniques of this disclosure make it possible so that not all network edge nodes need all of the policy data because not all of the identity information is going to be used in all the network edge nodes. That is, the techniques enable the edge routers to have access to the security policies and IP bindings on an as-needed basis, and the network controller can dynamically decide which edge nodes of the network have security policies enabled and which edge nodes need information about certain usernames and/or user groups. In other words, the network controller can use this information to intelligently distribute the IP bindings only to those edge nodes which need the data. This improves the operation of edge devices by not having to store unnecessary security policies and/or IP bindings that may never be used by the edge device. Additionally, this improves the application of security policies by edge devices in that regardless of where the edge device is located or where a user accesses the network from, the edge device is able to determine and apply the correct security policy.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A and 1B collectively illustrate an example architecture 100 and example operations that may be performed by the architecture to implement the various aspects of the technologies described herein. The example architecture 100 includes an on-premises network 102 and a wide area network 104.

In some examples, the on-premises network 102 may be representative of an enterprise network or another network with a local set of IT hardware and software devices. The exemplary on-premises network 102 includes one or more edge node(s) 106, one or more user device(s) 108, a directory service 110, an identity provider 112, and an agent 114. In examples, the user device(s) 108 may send traffic through the edge node(s) 106 and over the wide area network 104 to a destination, such as a service, an application, another on-premises network associated with the on-premises network 102, or the like.

In some examples, the wide area network 104 may be representative of a software-defined wide area network (SD-WAN), a multi-protocol label switching (MPLS) network, or the like. The exemplary wide area network 104 shown in FIGS. 1A and 1B includes a network management system (NMS) 120 and a controller 116. In some examples, the NMS 120 may be a centralized NMS that provides, in some instances, a graphical user interface so that the administrator(s) 118 may easily monitor, configure, and/or maintain the wide area network 104. In contrast, the controller 116 may provide a control plane for the wide area network 104, facilitate any data plane encryption between edge node(s) 106, and/or propagate centralized policies that establish and direct a fabric of the wide area network 104. It should be appreciated that the functionality and details of each of the controller 116 and the NMS 120 described herein could be implemented by a single component, instead of a distributed system. That is, instead of the controller 116 and the NMS 120 performing different functionalities, these functionalities could be performed by a common entity (e.g., a single controller or a single NMS, or another component).

In some instances, the example operations shown in FIGS. 1A and 1B may be performed by the devices/components of the architecture 100 to implement the various aspects of the technologies described herein for user identity-based security policy enforcement. For instance, the operations shown in FIG. 1A may be performed to set up or otherwise prepare the wide area network 104 for user identity-based policy enforcement. At operation "1," the NMS 120 may obtain user & group information 122 from the directory service 110. In some examples, the user & group information 122 may indicate usernames of individuals associated with the on-premises network 102. Additionally, in some instances, the user & group information 122 may indicate respective user groups that individual users are a part of. In some instances, the user & group information 122 may indicate SGT information associated with the users.

At operation "2," the administrator(s) 118 may configure one or more security policies 124 using the user & group information 122 received from the identity provider 112. In some examples, the security policies 124 may be user identity-based networking policies. For instance, the security policies 124 may indicate specific policy actions that are to be applied to traffic sent by certain users to certain destinations, on a per user basis. For example, the security policies 124 may indicate whether a specific user, "Rick," is allowed to send or receive traffic to/from one or more specific destinations, applications, services, etc. (e.g., YouTube). Additionally, in some examples, the security policies 124 may further indicate specific policy actions that are to be applied to traffic sent by members of certain user groups to certain destinations, as a whole. For example, the security policies 124 may indicate whether individual members of a group of users, for instance, "Rick, Aaron, and Blake" who are members of the group "Engineers," are allowed to send or receive traffic to/from one or more specific destinations, applications, services, etc. In some examples, the security policies 124 may be one of multiple networking policies that are to be applied to traffic sent by different user device(s) 108 and/or members of user groups.

At operation "3," the NMS 120 may push or otherwise provision at least a portion of the security policies 124 to/on the edge node(s) 106. For instance, the NMS 120 may push only those security policies 124 to the edge node(s) 106 that the NMS 120 determines will be used by the edge node(s) 106. As an example, a security policy associated with a user group with members located in the United States may not be pushed to edge node(s) 106 serving user device(s) 108 that are located in India.

The operations continue in FIG. 1B, and the operations shown in FIG. 1B are associated with the wide area network 104 actually implementing user identity-based policy enforcement. At operation "4," a user device of the user device(s) 108 may send an authentication request 126 to the directory service 110. For instance, the user device may send the authentication request 126 to the directory service 110 in association with the user device logging in to the on premises network 102 or the wide area network 104. That is, the user device may send the authentication request 126 to the directory service 110 to initiate a communication session.

At operation "5," the agent 114 may forward one or more IP binding(s) 128 to the identity provider 112. In some examples, the IP binding(s) 128 may be associated with the user device who established the communication session. For instance, the IP binding(s) 128 may indicate an IP address associated with the user device (e.g., an IP address to username binding). Additionally, or alternatively, the IP binding(s) 128 may indicate a user group that a user of the user device is a member of (e.g., a username to user group binding). Additionally, or alternatively, the IP binding(s) 128 may indicate a security group tag (SGT) associated with the IP address (e.g., an IP address to SGT binding).

At operation "6," the identity provider 112 may forward the one or more IP binding(s) 128 to the controller 116 of the wide area network 104. At operation "7," the controller 116 may forward at least a portion of the one or more IP binding(s) 128 to the edge node(s) 106. For instance, the controller 116 may send an indication of the IP binding(s) 128 to the edge node(s) 106 so that the edge node(s) 106 may apply a security policy to packet(s) 130 that include the IP address. In some instances, these IP binding(s) 128 may be distributed to the edge node(s) 106 by the controller 116 of the wide area network 104 using an overlay management protocol. In some examples, the IP binding(s) 128 may be configured on the edge node(s) 106 as a table or sent to the edge node(s) 106 as a table. In some instances, whether the controller 116 distributes the IP binding(s) 128 to certain edge node(s) 106 may be based on configured policies and/or edge node capabilities (e.g., presence of security policy, router capacity, etc.). In some examples, a security policy may be pushed from the controller and the security policy may reference an IP binding table, and the edge node(s) 106 may use the IP binding table to find a username and/or user group that a particular IP address belongs to in order to enforce the security policy at the edge node(s) 106.

At operation "8," the user device of the user device(s) 108 may send one or more packet(s) 130 to the edge node(s) 106. And, at operation "9," the edge node(s) 106 may forward a portion of the one or more packet(s) 130 on to the wide area network 104. In some examples, the edge node(s) 106 may use the IP binding(s) 128 to determine which user device(s) 108 are sending which packet(s) 130. For instance, the edge node(s) 106 may lookup an IP address included in a packet to determine which username is bound to that IP address, as well as whether that username is bound to any user groups. In this way, the edge node(s) 106 can determine how to handle the packet(s) 130 (e.g., allow the packet, deny the packet, drop the packet, etc.).

Figure 2A:
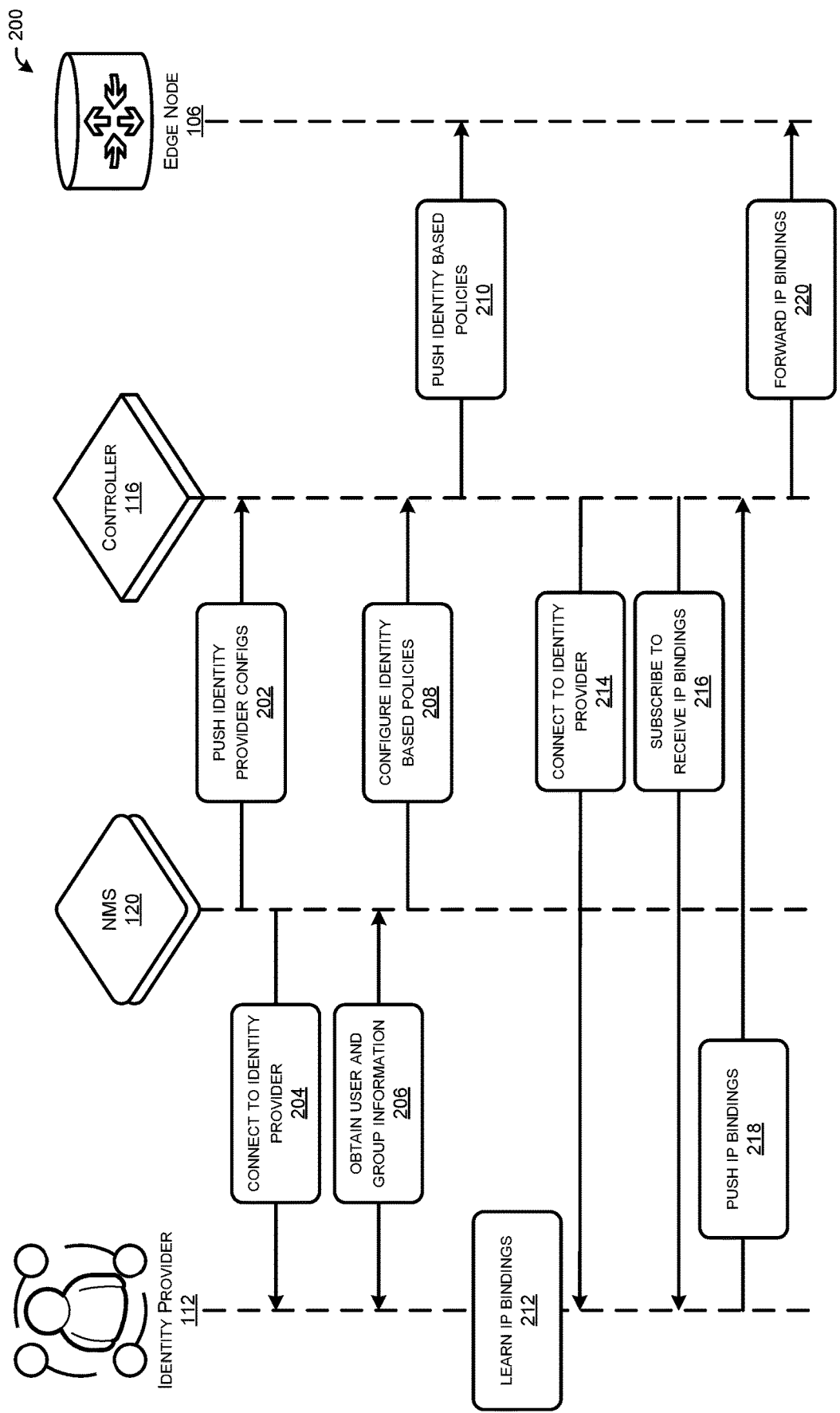
FIGS. 2A and 2B collectively illustrate a data flow diagram illustrating example operations that may be performed by a system to implement various aspects of the techniques described herein.
Figure 2B:
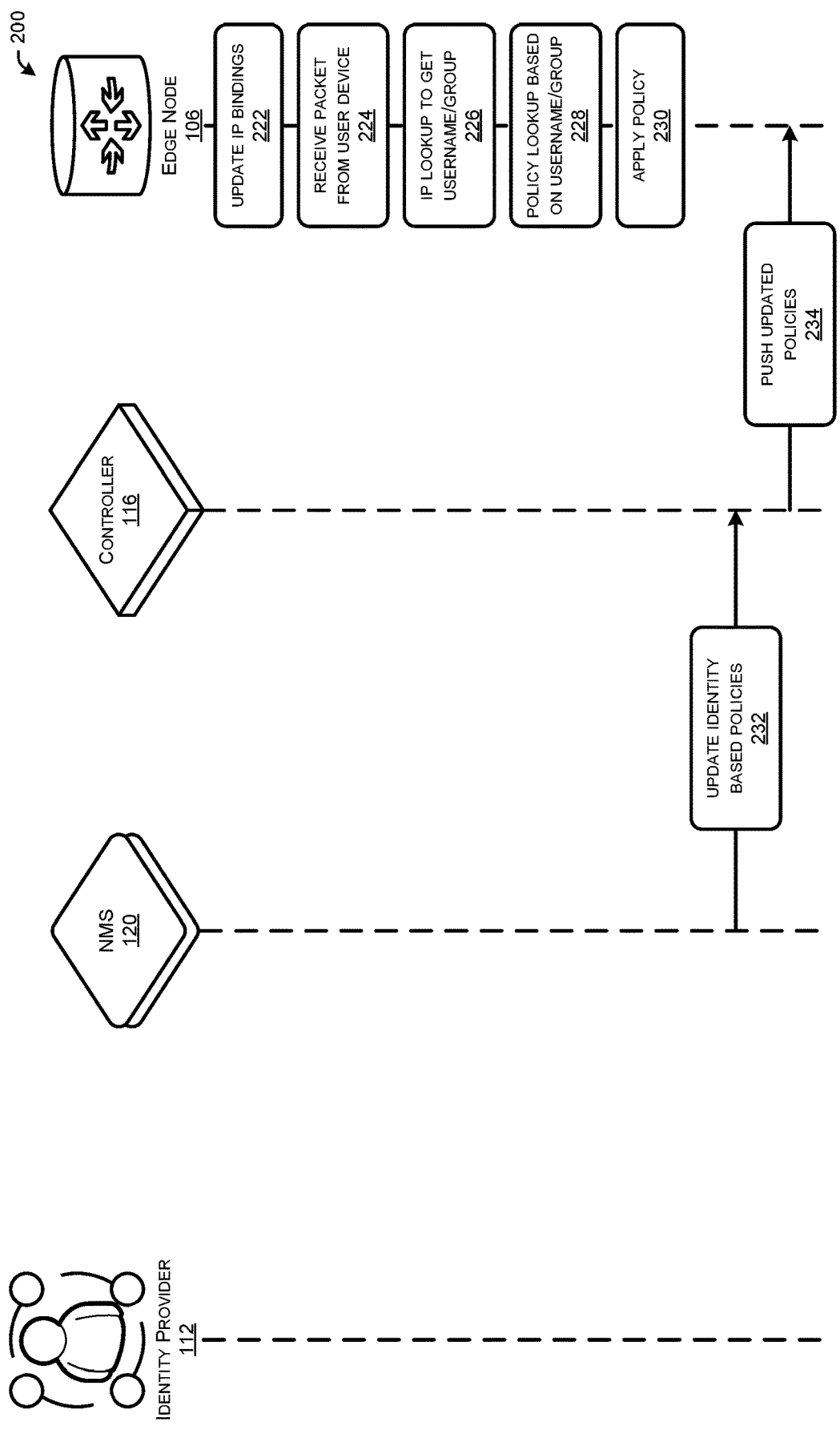

FIGS. 2A and 2B collectively illustrate a data flow diagram illustrating example operations 200 that may be performed by a system to implement various aspects of the techniques described herein. In some examples, prior to the beginning of the operations 200 shown, the identity provider 112 may be provisioned for identity services in the customer network, such as with directory service integration, credentials for application programming interfaces (APIs), which may support authentication, and the like. Additionally, the NMS 120 may be provisioned with credentials for the identity provider 112, and the identity provider 112 credentials may be configured for the controller 116 on the NMS 120 as well.

At operation 202, the NMS 120 may push identity provider 112 configuration(s) to the controller 116. At operation 204, the NMS 120 may connect to the identity provider 112. In some examples, the NMS 120 may connect to the identity provider 112 using one or more APIs. At operation 206, the NMS 120 may obtain user and group information from the identity provider 112. In some examples, the NMS 120 may initially obtain the user identities and group information from a directory service, and the identity provider 112 may publish any updates to the user identities and/or user groups to the NMS 120.

At operation 208, the NMS 120 may configure identity-based security policies on the controller 116. For instance, a network administrator may configure the identity-based policies using the NMS 120, and the NMS 120 may publish those identity-based policies to the controller 116. At operation 210, the controller 116 may push the identity-based policies to the edge node 106. In some examples, the identity-based security policies may be user identity-based networking policies. For instance, the identity-based policies may indicate specific policy actions that are to be applied to traffic sent by certain users to certain destinations, on a per user basis. For example, the identity-based policies may indicate whether a specific user is allowed to send or receive traffic to/from one or more specific destinations, applications, services, etc. Additionally, in some examples, the identity-based policies may further indicate specific policy actions that are to be applied to traffic sent by members of certain user groups to certain destinations, as a whole. For example, the identity-based policies may indicate whether individual members of a group of users are allowed to send or receive traffic to/from one or more specific destinations, applications, services, etc. In some examples, the identity-based policies may be one of multiple networking policies that are to be applied to traffic sent by different user device(s) and/or members of user groups.

At operation 212, the identity provider 112 may learn one or more IP bindings from the directory service. For instance, a user device may send an authentication request to a directory service to start a communication session, and the identity provider 112 may learn an IP binding associated with the user device from the directory service. At operation 214, the controller 116 may connect to the identity provider 112. At operation 216, the controller 116 may subscribe to receive the IP bindings from the identity provider 112. At operation 218, the identity provider 112 may push the IP bindings to the controller 116. For instance, the identity provider 112 may push the IP binding associated with the user who just authenticated, as well as other IP bindings, in some instances.

After receiving the IP bindings from the identity provider 112, the controller 116 may, at operation 220, forward one or more of those IP bindings to the edge node 106. For instance, the controller 116 may send an indication of the IP bindings to the edge node 106 so that the edge node 106 may apply a security policy to packets that include the IP address. In some instances, these IP bindings may be distributed to the edge node 106 by the controller 116 using an overlay management protocol. In some examples, the IP bindings may be configured on the edge node as a table or sent to the edge node as a table.

Turning to FIG. 2B, at operation 222, the edge node 106 may update one or more of the IP bindings stored locally on the edge node 106 or in a memory that is accessible to the edge node. For instance, the edge node 106 may update an IP binding table stored by the edge node 106. At operation 224, the edge node 106 may receive a packet from a user device. The packet may include an IP address. At operation 226, the edge node 106 may perform an IP address lookup to determine a username and/or user group associated with a user of the user device that sent the packet. That is, the edge node 106 may utilize the IP bindings to determine which user sent the packet based on the IP address included in the packet. At operation 228, the edge node 106 may perform a policy lookup based on the determined username and/or user group of the user. That is, the edge node 106 may, using the determined username and/or user group determined in operation 228, determine which policy action to apply to the packet. At operation 230, the edge node 106 may apply the policy to the packet.

At operation 232, the NMS 120 may update one or more of the identity-based policies and send those updated policies to the controller 116. For instance, an administrator may update a policy to allow or deny a user or a group of users access to a particular service, application, website, etc. At operation 234, the controller 116 may push the updated policies to the edge node 106.

FIG. 3 is a table 300 (e.g., a policy table) illustrating example identity-based policies that may be enforced with respect to traffic sent by members of a particular user group and/or a particular user. The column labeled source 302 indicates respective users and user groups, such as user group A, user group B, user group C, username A, username B, username C, and "any," which may be allocated to unknown source devices and/or IP addresses, as well as undefined users/groups (e.g., those users for which no policy is in place). The column labeled destination 304 indicates respective destinations and combinations of destinations, such as destinations A, B, and C, as well as any destination, which is an undefined destination for the policy. The column labeled policy action 306 indicates respective policy actions that are to be performed for traffic sent from a respective source to a respective destination for which there is a defined policy. Policy actions may include allowing traffic, denying traffic, dropping traffic, and the like.

Example policies are shown in the respective rows of the table 300. For instance, in the first row of the table 300, the policy is to allow members of user group A to send traffic to destination A. In the second row of the table 300, the policy is to allow members of user group B to send traffic to destinations A and B. As another example policy for username B, the policy is to deny username B from sending traffic to destination B. For any source and any destination, the policy is to drop traffic. It is to be appreciated that the example policies shown in FIG. 3 are merely exemplary, and that additional and different policies may be configured.

Figure 4:
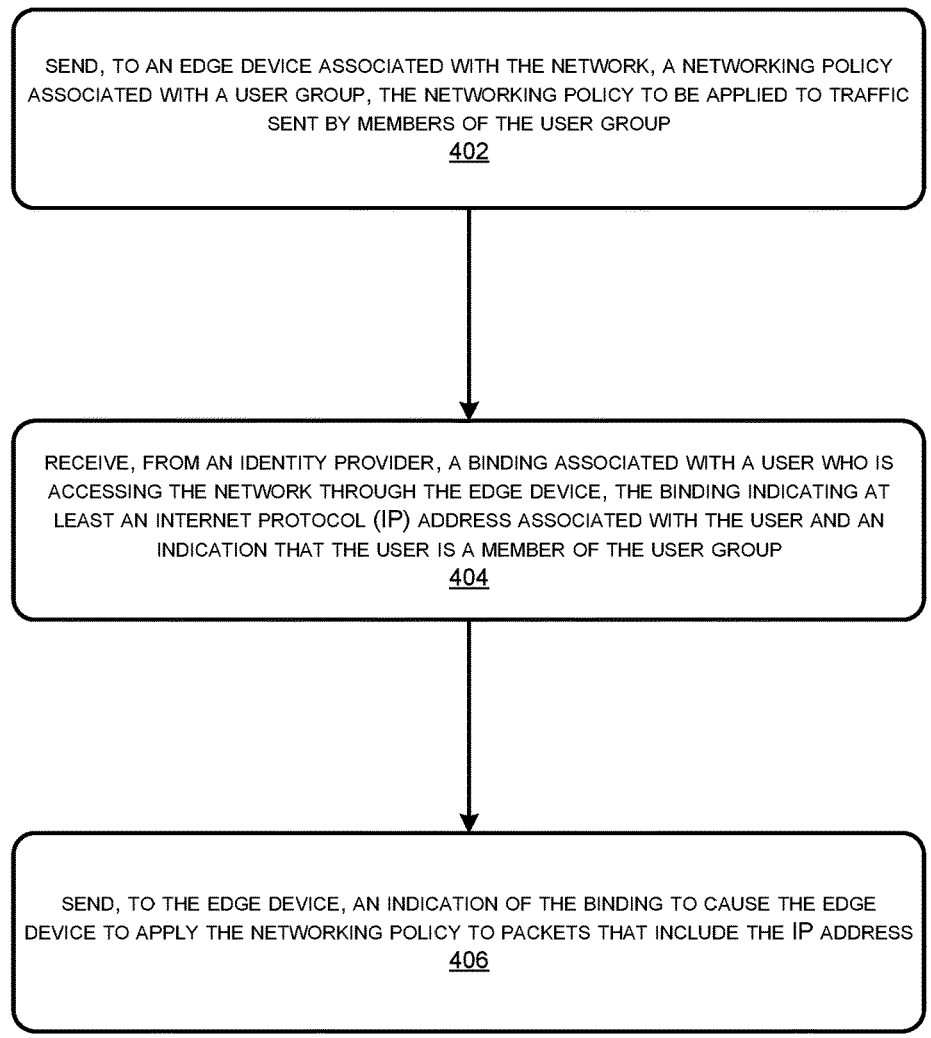
FIG. 4 is a flow diagram illustrating an example method associated with identity-based policy enforcement.
Figure 5:
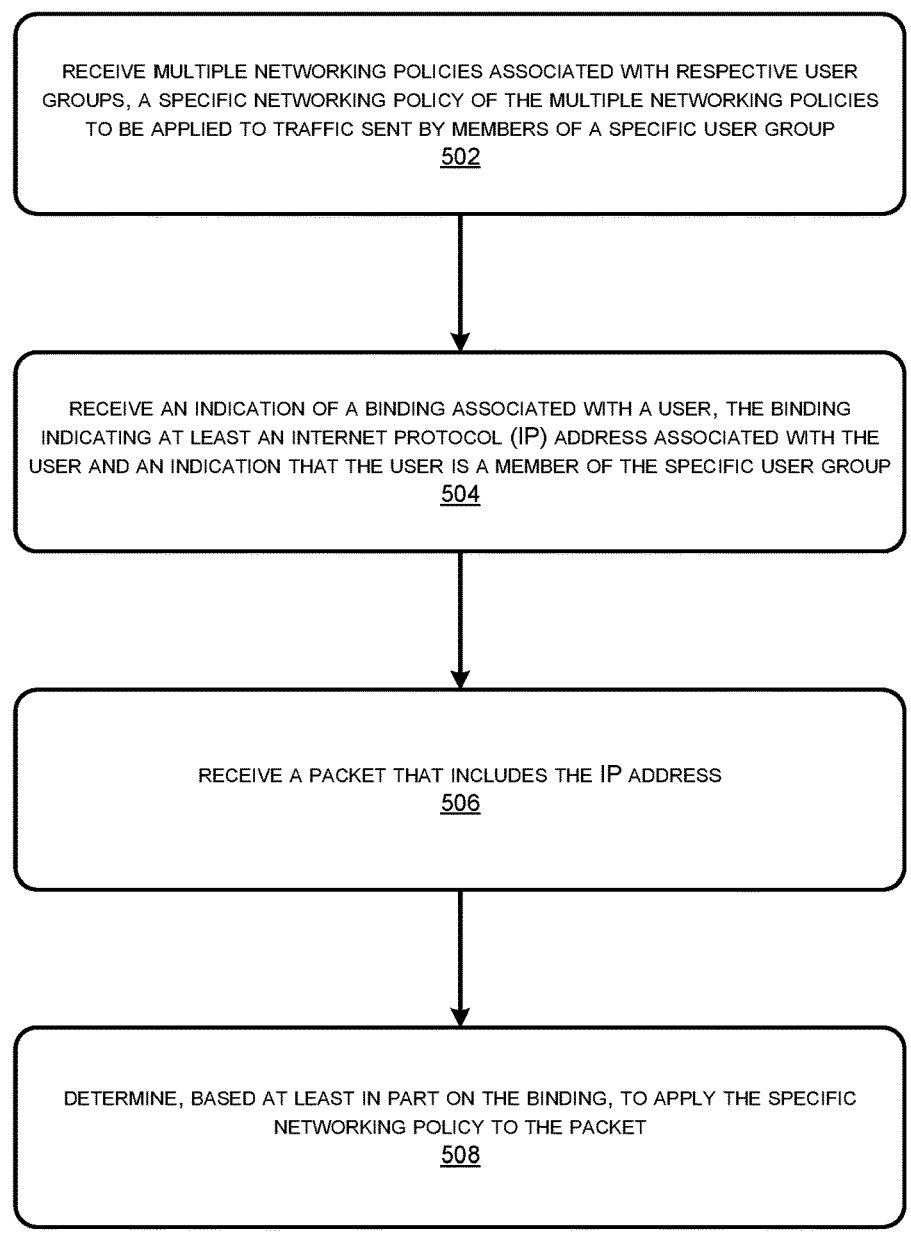
FIG. 5 is a flow diagram illustrating another example method associated with identity-based policy enforcement.

FIGS. 4 and 5 are flow diagrams illustrating example methods 400 and 500 associated with the identity-based policy enforcement techniques disclosed herein. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 400 illustrated in FIG. 4 may be performed in whole, or in part, by a controller of a network to implement some of the techniques disclosed herein for identity-based security policy enforcement. The method 400 begins at operation 402, which includes sending, to an edge device associated with the network, a networking policy associated with a user group, the networking policy to be applied to traffic sent by members of the user group. For instance, the controller 116 may send, to the edge node(s) 106, a networking policy associated with a user group, the networking policy to be applied to traffic sent by members of the user group.

At operation 404, the method 400 includes receiving, from an identity provider, a binding associated with a user who is accessing the network through the edge device, the binding indicating at least an IP address associated with the user and an indication that the user is a member of the user group. For instance, controller 116 may receive, from the identity provider 112, a binding associated with a user who is accessing the network through the edge node 106, the binding indicating at least an IP address associated with the user and an indication that the user is a member of the user group.

At operation 406, the method 400 includes sending, to the edge device, an indication of the binding to cause the edge device to apply the networking policy to packets that include the IP address. For instance, the controller 116 may send, to the edge node(s) 106, an indication of the binding to cause the edge node(s) 106 to apply the networking policy to packets that include the IP address.

Turning to FIG. 5, the exemplary method 500 may be performed in whole, or in part, by an edge node (e.g., edge router) to implement some of the techniques disclosed herein for identity-based security policy enforcement. The method 500 begins at operation 502, which includes receiving multiple networking policies associated with respective user groups, a specific networking policy of the multiple networking policies to be applied to traffic sent by members of a specific user group. For instance, the edge node 106 may receive the multiple networking policies associated with the respective user groups, the specific networking policy of the multiple networking policies to be applied to the traffic sent by the members of the specific user group.

At operation 504, the method 500 includes receiving an indication of a binding associated with a user, the binding indicating at least an IP address associated with the user and an indication that the user is a member of the specific user group. For instance, the edge node 106 may receive the indication of the binding associated with the user, the binding indicating at least the IP address associated with the user and the indication that the user is the member of the specific user group.

At operation 506, the method 500 includes receiving a packet that includes the IP address. For instance, the edge node 106 may receive the packet that includes the IP address.

At operation 508, the method 500 includes determining, based at least in part on the binding, to apply the specific networking policy to the packet. For instance, the edge node 106 may determine, based at least in part on the binding, to apply the specific networking policy to the packet. For instance, the edge node may look up the IP address included in the packet to determine, based on the IP bindings, which username is bound to that IP address, as well as whether that username is bound to any user groups. In this way, the edge node can determine how to handle the packet (e.g., allow the packet, deny the packet, drop the packet, etc.).

Figure 6:
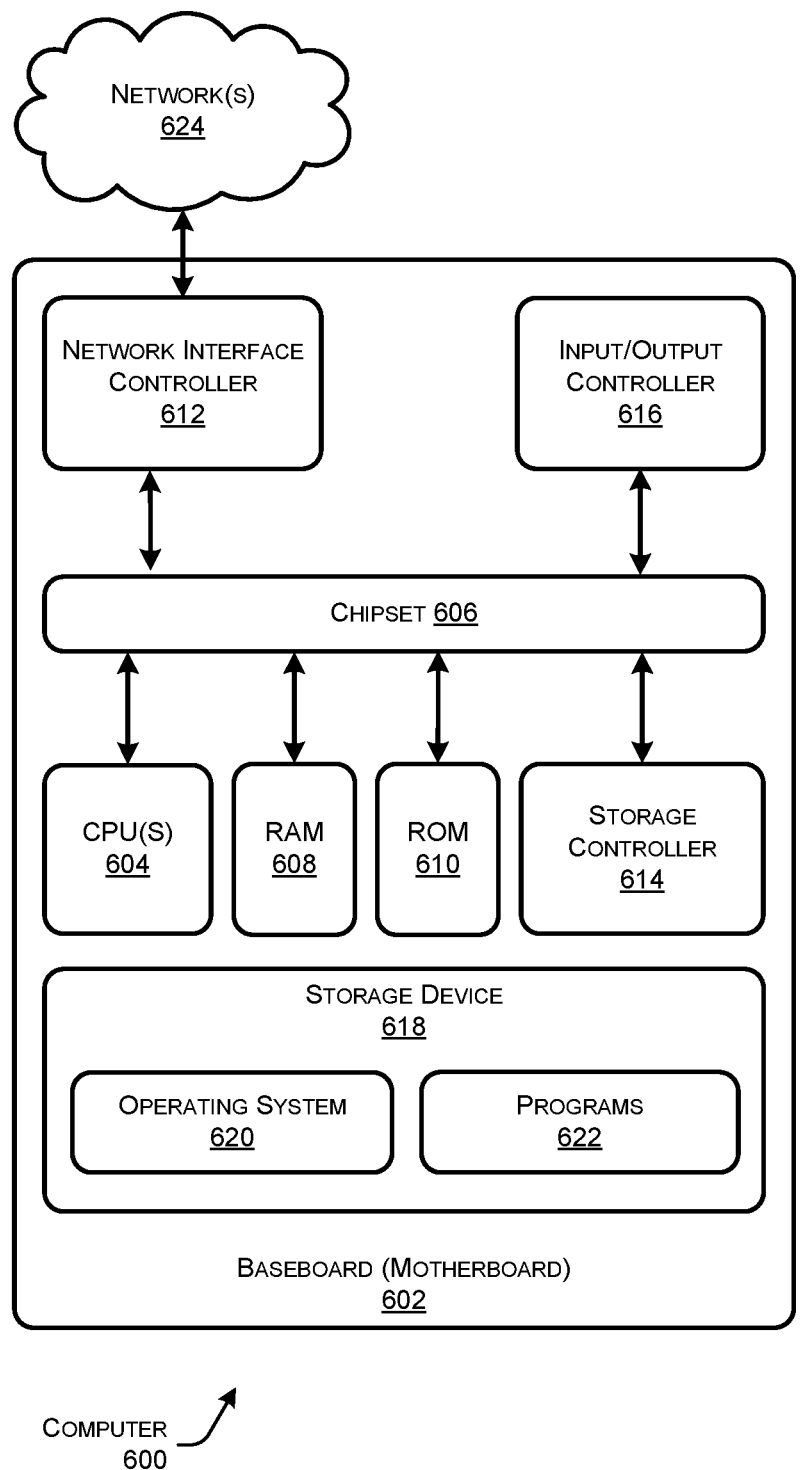
FIG. 6 is a block diagram showing an illustrative computer hardware architecture for implementing a computing device that can be utilized to implement aspects of the various technologies presented herein.

FIG. 6 is a block diagram showing an illustrative computer hardware architecture for implementing a computing device that can be utilized to implement aspects of the various technologies presented herein. The computer architecture shown in FIG. 6 illustrates a conventional server computer, network node (e.g., edge node), router, workstation, desktop computer, laptop, tablet, network appliance, e-reader, smartphone, load balancer, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the on-premises network 102, the wide area network 104, or the like. The chipset 606 can include functionality for providing network connectivity through a NIC 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems. In some examples, the NIC 612 may be configured to perform at least some of the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the architecture 100 and or any components included therein, may be supported by one or more devices similar to computer 600. Stated otherwise, some or all of the operations performed by the architecture 100, and or any components included therein, may be performed by one or more computer devices 600 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes and functionality described above with regard to FIGS. 1-5, and herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors (processors) configured to execute one or more stored instructions. The processor(s) may comprise one or more cores. Further, the computer 600 may include one or more network interfaces configured to provide communications between the computer 600 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for user identity-based security policy enforcement.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a network controller of a network, the method comprising:

identifying, by the network controller, an edge device associated with the network, the edge device corresponding to a user;

sending, from the network controller and based on networking policies associated with the edge device, a networking policy associated with the user to the edge device;

receiving, by the network controller and from an identity provider, a first internet protocol (IP) address associated with the user; and sending, from the network controller and to the edge device, an indication to associate the first IP address with the user and instructions to cause the edge device to apply the networking policy to packets that include the first IP address.

2. The method of claim 1, further comprising:

receiving, from the identity provider, a second IP address associated with the user, the second IP address different from the first IP address; and sending, to the edge device or another edge device, another indication to associate the second IP address with the user such that the edge device or the other edge device applies the networking policy to packets that include the second IP address.

3. The method of claim 1, further comprising:

receiving, from the identity provider, a second IP address associated with the user, the second IP address different from the first IP address; and sending, to the edge device, an indication to dissociate the first IP address with the user.

4. The method of claim 1, wherein the networking policy is associated with a user group, the user being a member of the user group.

5. The method of claim 1, wherein the network is a software-defined wide area network (SD-WAN) and the network controller is a software defined networking (SDN) controller.

6. The method of claim 1, wherein receiving the first IP address associated with the user from the identity provider comprises:

receiving an indication that the user logged into the network; and obtaining, from the identity provider, an IP address to username binding and a username to user group binding associated with the user.

7. The method of claim 1, wherein the edge device is configured to, responsive to receiving a packet that includes the first IP address, determine the networking policy that is to be applied to the packet based at least in part on a binding stored by the edge device, the binding indicating that the first IP address is associated with the user.

8. A system associated with a network controller of a network, the system comprising:

one or more processors; and one or more non-transitory computer-readable media storing instructions that, when executed by the one or more processors, cause the network controller to perform operations comprising:

identifying, by the network controller, an edge device associated with the network, the edge device corresponding to a user;

sending, from the network controller and to the edge device, a networking policy associated with a user group, the networking policy to be applied to traffic sent by members of the user group;

receiving, by the network controller and from an identity provider, a binding associated with the user who is accessing the network through the edge device, the binding indicating at least an internet protocol (IP) address associated with the user and an indication that the user is a member of the user group; and based at least in part on the indication that the user is the member of the user group, sending, by the network controller and to the edge device, an indication of the binding and instructions to cause the edge device to apply the networking policy to packets that include the IP address.

9. The system of claim 8, the operations further comprising:

receiving, from the identity provider, another binding associated with the user, the other binding indicating at least another IP address associated with the user; and sending, to the edge device or to another edge device, another indication of the other binding to cause the edge device or the other edge device to apply the networking policy to packets that include the other IP address.

10. The system of claim 8, the operations further comprising:

receiving, from the identity provider, another binding associated with the user, the other binding indicating at least another IP address associated with the user that different from the IP address; and sending, to the edge device, an indication to dissociate the IP address with the user.

11. The system of claim 8, wherein the networking policy is one of multiple networking policies sent to the edge device, each one of the multiple networking policies to be applied to traffic sent by members of different user groups.

12. The system of claim 8, wherein the binding includes a first binding between a username associated with the user and an IP address and a second binding between the username and the user group.

13. The system of claim 12, wherein the edge device is configured to:

receive a packet;

determine that the packet was sent by the user based at least in part on the first binding and a determination that the packet includes the IP address; and determine to apply the networking policy to the packet based at least in part on the second binding indicating that the username associated with the user is a member of the user group.

14. The system of claim 8, wherein the network is a software-defined wide area network (SD-WAN) and the network controller is a software defined networking (SDN) controller.

15. The system of claim 8, wherein receiving the binding associated with the user from the identity provider comprises:

receiving an indication that the user logged into the network; and obtaining, from the identity provider, the binding associated with the user.

16. One or more non-transitory computer-readable media storing instructions that, when executed, cause one or more processors associated with an edge device to perform operations comprising:

receiving, by the edge device within a network and from a controller of the network, multiple networking policies associated with respective user groups that access the network via the edge device, a specific networking policy of the multiple networking policies to be applied to traffic sent by members of a specific user group;

receiving, by the edge device and from the controller, an indication of a binding associated with a user, the binding indicating at least an internet protocol (IP) address associated with the user and an indication that the user is a member of the specific user group;

receiving, by the edge device, a packet that includes the IP address; and determining, based at least in part on the binding indicating the user is the member of the specific user group and the packet including the IP address, to apply the specific networking policy to the packet.

17. The one or more non-transitory computer-readable media of claim 16, the operations further comprising:

receiving, from the controller, another binding associated with the user, the other binding indicating at least another IP address associated with the user;

receiving another packet that includes the other IP address; and determining, based at least in part on the other binding, to apply the specific networking policy to the other packet.

18. The one or more non-transitory computer-readable media of claim 16, wherein the binding includes a first binding between a username associated with the user and the IP address and a second binding between the username and the specific user group.

19. The one or more non-transitory computer-readable media of claim 16, wherein the network is a software-defined wide area network (SD-WAN) and the controller is a software defined networking (SDN) controller.

20. The one or more non-transitory computer-readable media of claim 16, the operations further comprising storing, in a memory accessible to the edge device, at least one of the multiple networking policies or the binding associated with the user.

* * * * *